United States Patent [19]

Bruel

[11] 3,890,775

[45] June 24, 1975

[54] BEATING DEVICE FOR A GRAPE-GATHERING MACHINE

[76] Inventor: Alain Bruel, Domaine du Petit Chaumont, Aigues-Mortes, France

[22] Filed: June 11, 1973

[21] Appl. No.: 368,787

[30] Foreign Application Priority Data

June 9, 1972 France .................... 72.21513

[52] U.S. Cl. ............................................... 56/330
[51] Int. Cl. ............................................ A01g 19/00
[58] Field of Search ................ 56/330, 29, 46, 130

[56] References Cited
UNITED STATES PATENTS

| | | | |
|---|---|---|---|
| 450,584 | 4/1891 | House | 56/29 |
| 2,489,963 | 11/1949 | Henley | 56/30 |
| 3,203,159 | 8/1965 | Weygandt et al. | 56/1 |
| 3,439,482 | 4/1969 | Orton | 56/330 |
| 3,686,842 | 8/1972 | Littau | 56/330 |
| 3,703,072 | 11/1972 | Patzlaff | 56/330 |

*Primary Examiner*—Russell R. Kinsey
*Attorney, Agent, or Firm*—Sughrue, Rothwell, Mion, Zinn & Macpeak

[57] ABSTRACT

A grape gathering machine is disclosed in which a plurality of tunnel defining members are supported on a mobile structure such that when the mobile structure is moved through the vinyard, the tunnel defining members pass over two adjacent rows of vine stocks. The tunnel defining members are adjustable laterally to accommodate varying widths of vine stock placement. Mounted within each of the tunnel defining members are beating devices to "beat" or "shake" the vine stocks so as to remove the grapes therefrom. The frames of the beating devices are pivotablly attached to the tunnel defining members and have a plurality of rods attached to each end thereof for "beating" or or "shaking" the vine stock. The beating devices are caused to oscillate by a double acting hydraulic jack mechanism. The lengths of the linkage interconnecting the hydraulic jack mechanism with the beating device frame can be varied so as to control the movement of the beating devices and, consequently, the location at which the grapes are delivered, i.e., toward the center of the mobile structure or to either side thereof.

15 Claims, 20 Drawing Figures

BEATING DEVICE FOR A GRAPE-GATHERING MACHINE

FIELD OF THE INVENTION

The present invention relates to a beating device for a grape gathering machine.

PRIOR ART

It is known to construct a grape-gathering machine in the shape of one or more tunnels, each of which tops a row of vine stocks along which it is moved. Said tunnel contains the beating members which act on either side of the vine stocks to tear off the grapes therefrom. On a level with the ground a recovering device is provided, which is adapted to receive the vintage.

The beating devices known to date have several drawbacks. The pneumatic arrangements cause the grape juice to be guickly oxidised. The mechanical arrangements, which use needles, injure the vines and collect only a fairly low percentage of the grapes: in particular, they do not allow picking up some clusters of grapes which are hidden behind the leaves.

Moreover, the known machines are symmetrical with respect to the row of vine stocks. A comparatively great amount of grape clusters falls between the stocks, and it is necessary to provide a passageway between the stocks in a same row to recover the fallen clusters.

SUMMARY OF THE INVENTION

The object of the present invention is to obviate such drawbacks, and to provide a beating device for grape-gathering machines which is efficient, does not injure the vines, and lays down the vintage between the rows of stocks.

The device according to the invention is adapted to be fitted both on a grape-gathering machine having a single tunnel, the grapes being discharged on either side of the row of stocks, or on a machine having two adjacent tunnels, the grapes being discharged only in the central gap lying between the two rows of stocks.

A beating device according to the invention for a grape-gathering machine including at least one tunnel defining member in the shape of a downwardly open U, the two vertical arms of which move on either side of a row of vine stocks. On each of the arms of the tunnel defining member at least one frame is pivotally mounted about a vertical spindle parallel to the arm, each frame having flexible and resilient rods projecting from each end of said frame in the manner of the teeth of a comb. The rods are rearwardly directed with respect to the direction of movement of the machine, the assembly of rods mounted on one frame constituting a whip. Means are provided for controlling the swinging of the whip-carrying plates to bring the whips nearer to or farther from the centre of the tunnel defining member. All the whips disposed on the same side of the row of vines are imparted movements identical with each other, said motions being out of phase with respect to the motions of the whips disposed on the other side of said tunnel defining member.

The movement of the whips is controlled by double-acting hydraulic jacks, each of which has a horizontal cylinder fixed to the machine, and a sliding rod extending from each end of said cylinder, one end of which is linked to one whip carrying frame, while the other end is linked to another whip carrying frame mounted on the same side of the tunnel.

Each whip carrying frame operates in opposite phase to the opposed whip carrying frame located in the same transverse section of the tunnel defining member; and in phase with the whip carrying frame or frames located in the same row, that is, on the same side of the tunnel defining member.

According to another feature, the whips located on the outer side of a row of vine stocks are imparted a motion which is out of step with respect to the swinging motion of the whips located on the inner side of the row, the amplitude of the motion of the outer whips being higher than the amplitude of the inner or whips. The link connecting one end of the jack rod to a frame carrying the first set of whips may be a greater length than that of the link mounted between a jack rod and a frame carrying a second set of whips, so that said difference in length of the links imparts to the first whips a swinging motion, the amplitude of which is greater than that of the synchronous motion of the second whips.

BRIEF DESCRIPTION OF THE DRAWINGS

The accompanying drawing, given by way of non-limiting example, will enable the features of the invention to be clearly understood.

DETAILED DESCRIPTION OF THE PREFERRED EMBODIMENTS

Figure 1:
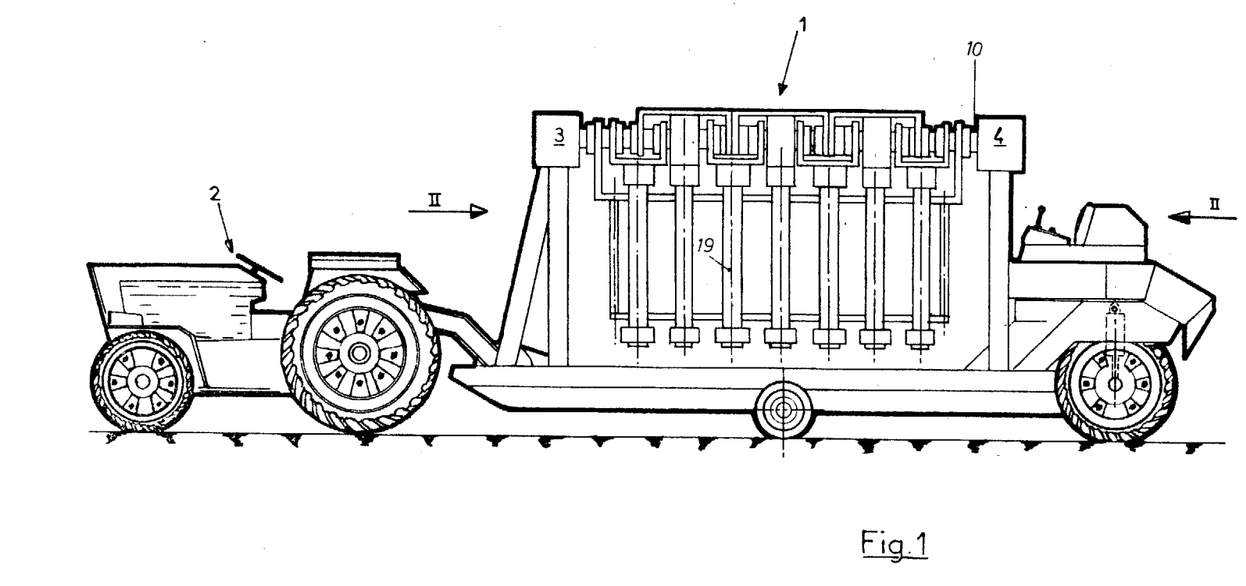
FIG. 1 is a side elevation of the assembly of a grape-gathering machine provided with a beating device according to the invention.
Figure 2:
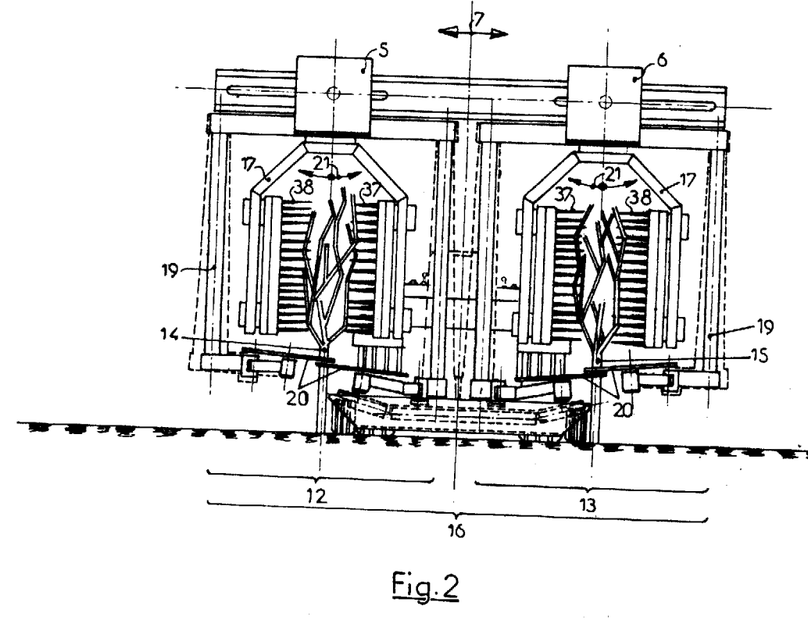
FIG. 2 is front view in the direction of arrow II of FIG. 1.
Figure 3:
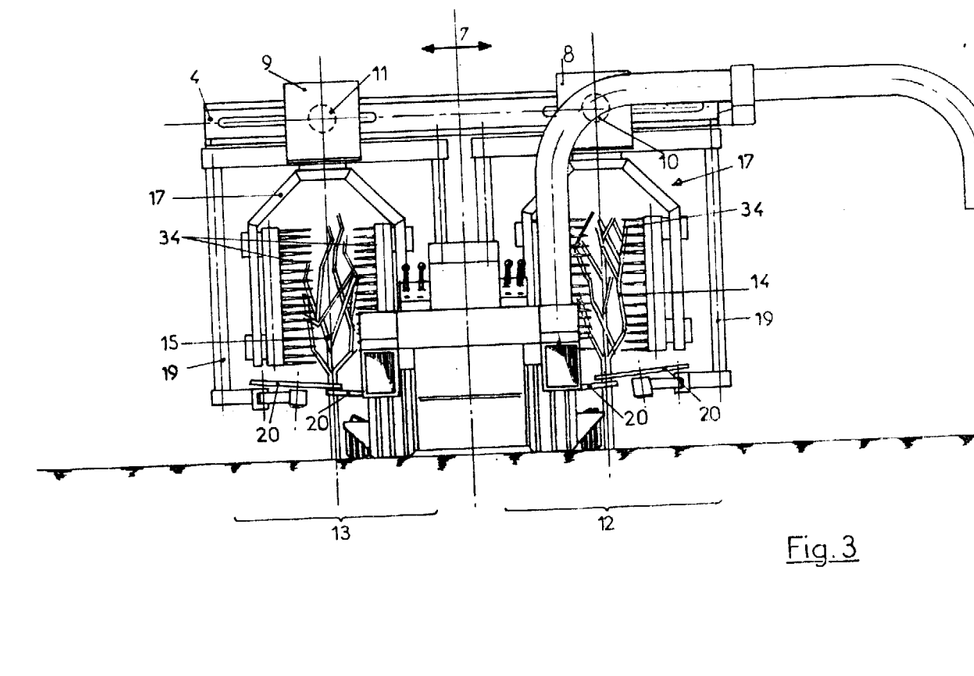
FIG. 3 is a rear view in the direction of the arrow III of FIG. 1.
Figure 4:
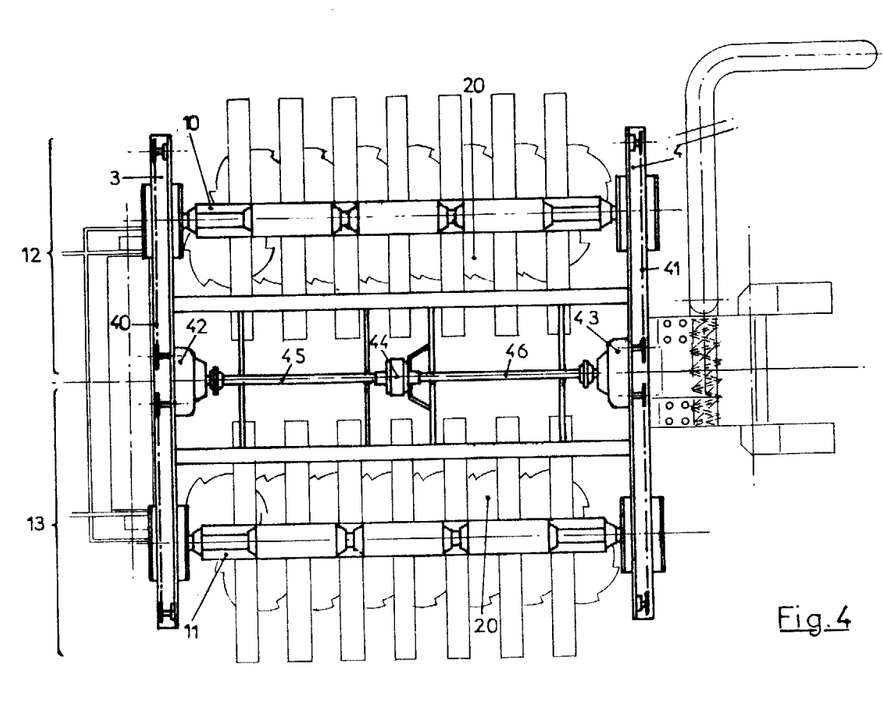
FIG. 4 is a plan view showing the mechanism for the travellers on the machine.

The drawings show a grape-gathering machine 1 hauled by an agricultural tractor 2. Said machine 1 is provided with two transverse runways 3 and 4, shown in FIGS. 1 and 4, disposed at the front and at the rear of the machine, respectively. Said runways are located at the upper part of the machine, that is, at several metres above the ground. Two travelling carriages 5 and 6 are mounted transversely disposed to one another on the front runway 3, said carriages being able to move away from or come closer to each other (double arrow 7, FIG. 2). Two travelling carriages 8 and 9 are mounted likewise on the rear transverse runway 4 (FIG. 3).

The carriages 5 and 8, on the one hand, and the carriages 6 and 9, on the other hand, are interconnected by longitudinal shafts 10 and 11 (FIG. 4). tunnel of said shafts constitutes a traveller from which the supports of the grape-gathering members are suspended. The machine defines thus two longitudinal spaces 12 and 13 adapted to work simultaneously on two rows of vine stocks 14 and 15 (FIG. 2). Said spaces 12 and 13 constitute together the grape-gathering corridor 16.

Each space 12, 13 is provided with the following members, which are connected to and hang from its shaft 10 or 11:

a tunnel defining member 17 in the shape of a downwardly open U, which carries the beating members intended for making the grapes fall from the vine stocks 14 or 15 and swinging frames 19, the bases of which carry the recovery members 20.

The tunnel defining members 17 and the swinging frames 19 are capable of swinging independently with respect to the shafts 10 or 11 (FIG. 2; double arrow 21).

Figure 9:
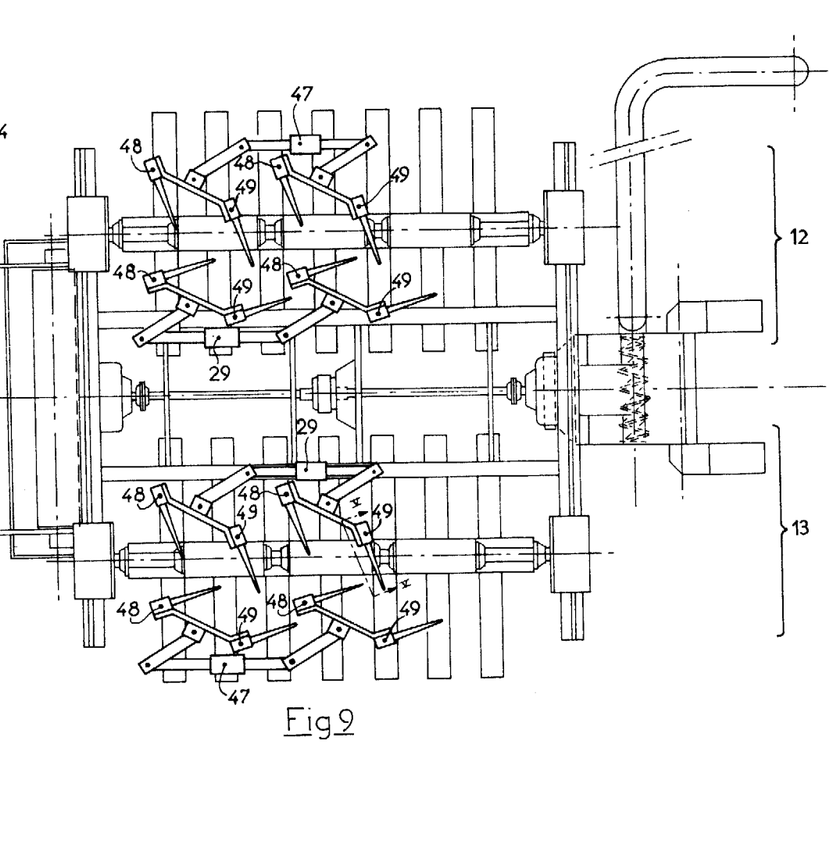
FIGS. 9 and 10 are plan views showing the disposition of the beating members operating in opposition of phase.
Figure 10:
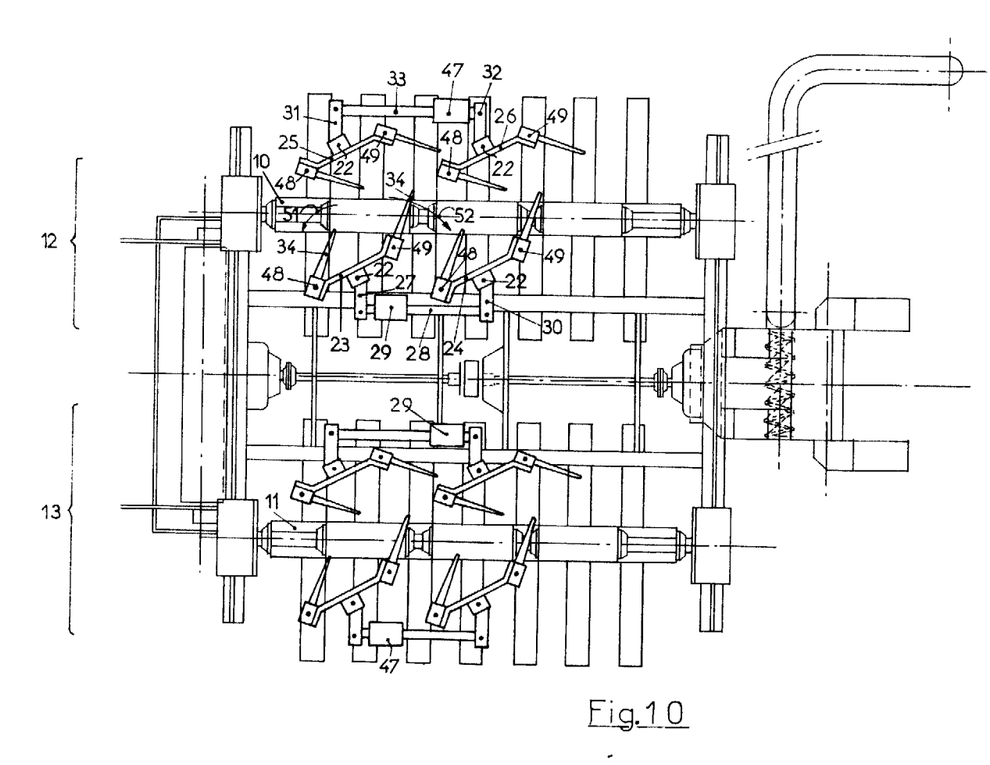

According to a first embodiment, as shown in FIGS. 9 and 10, a frame 23 is rigidly attached to an arm 27 which is pivotally connected to one end of rod 28 of a hydraulic jack, the cylinder 29 of which is fixedly mounted to one wall of tunnel defining member 17. Said rod 28 projects on either side of the cylinder 29, while its opposite end is linked to the arm 30 of the frame 24. Frame 24 is likewise attached to arm 30 which is pivotally attached to the other end of rod 28.

The arm 31, the frame 25 and the arm 32, the frame 26 are likewise connected to each other and to the two ends of the sliding rod 33 of a jack, the cylinder of which 47 is fixed to the opposed wall of the tunnel defining member 17.

Figure 5:
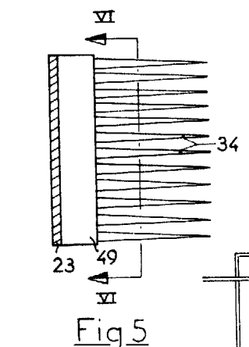
FIG. 5 is a side view of a plate and beating whips.

Each of frames 23 24, 25 and 26 is attached at its ends, to two vertical plates 48 and 49, each of which carries a whip constituted by a plurality of flexible horizontal rods 34. The rods 34 on a given plate, such as 48, are disposed in the manner of the teeth of a comb of which said plate would be the back (FIG. 5). The frames 23, 24, 25 and 26 are pivotally attached to spindles 22 which are, in turn, attached to the tunnel defining member 17.

Figure 6:
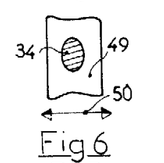
FIG. 6 is a sectional view along line VI—VI of FIG. 5, showing a first mounting embodiment of a whip on its supporting plate.
Figure 7:
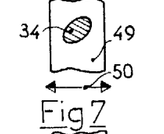
FIG. 7 is a sectional view similar to FIG. 6, but; showing a second embodiment of a whip on its supporting plate.
Figure 8:
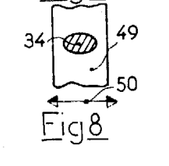
FIG. 8 is a sectional view also similar to FIG. 6 but, showing a third embodiment of a whip on its supporting plate.

Each rod 34 has preferably an oval or elongated cross-section (FIGS. 6, 7 and 8). Thus, by varying the orientation of the larger diameter of the oval of each rod 34 at the time it is being mounted in its supporting plate, such as 48, the characteristics of flexibility of said rod are modified in the transverse direction indicated by the double arrow 50. The flexibility is at a maximum for the orientation shown in FIG. 6, intermediate for the oblique orientation as shown in FIG. 7, and at a minimum for the orientation as shown in FIG. 8.

The two plates 48 and 49 are obliquely fixed onto the ends of frames 23, 24, 25 and 26 as shown in FIGS. 9 and 10. Thus, the rods 34 of the plate 48 come to hit the vine from the rear forward (arrow 51) during the forward stroke of the jack 28–29 (FIG. 10), while the rods 34 of the plate 49 hit the vine from the front rearward (arrow 52) during the return stroke of said jack 28–29. Owing to this motion, the ends of the rods 34 of the plates 48 and 49 on either side of tunnel defining member 17 describe paths which overlap each other and are adapted to cross each other behind an obstacle, while removing the blind angles. This makes it possible, for instance, to detach a cluster of grapes hidden behing a branch and leaves, which ensures collecting 90 percent, or even more, of the vintage, whatever may be the type of stocks and the capacity of the clusters for being detached.

Each jack 28–29 or 47–33 is a double-acting hydraulic jack. The circuitry utilized to control the jack is not shown since such is well known in the art. The actuations of rods 28 and 33 are adjusted in opposite phase, that, when the rod 28 and, consequently, frames 23 and 24 and whips 34 reach the end of their hitting stroke on the right-hand side of the tunnel 12 (FIG. 10), the rod 33 and, consequently, the frames 25 and 26, and whips 34 are reaching the end of their return stroke, and conversely. Thus the two plates 48 disposed opposite each other on two sides of a tunnel 12 or 13 are always in opposite phase. The same applies to the pairs of oppositely disposed plates 49.

Owing to this arrangement, all the reactions of the different whips 34 on the vine balance, and the "corridor" 16 does not tend to swing permanently below its shaft 10.

Each whip 34 is preferably formed as the tip of a fishing-rod, that is, its end is tapered and more flexible.

The difference in phase for the jacks 28–29 and 33–47 is obtained, for instance, by crossing the feeds therefor, which are mounted in series. The exhaust of the jack 28–29 is connected to the inlet of the jack 33–47, and conversely.

The penetration of the whips 34 in the foliage and the beating amplitude are adjustable by adjusting the forwards strokes of the rods 28 and 33. This disposition is of great importance, as it allows adjusting:

not only the amplitude of the beaters, but also the starting angular position thereof. This adjustment allows thus selecting the spacing between the points of two opposite beaters.

It will be seen in FIG. 9 that the relative disposition of the beating members remains opposed during the following stage, that is, when the rod 33 reaches the end of its back-stroke on the right-hand side of the tunnel 12, the rod 28 of said tunnel reaches the end of its forward stroke.

Lastly, the spacing between the two shafts 10 and 11 is adjusted by connecting to the carriages 8, 9 and 5, 6. To adjust the spacing, a transmission means including endless chains 40 and 41 is housed inside the runways 3 and 4 is provided. The chain 40 is actuated by a reducer 42 disposed in the central portion of the runway 3, while a similar reducer 43, disposed oppositely on the runway 4, actuates the endless chain 41. The two reducers 42 and 43 are controlled from a single hydraulic engine 44 (FIG. 4) by means of transmission shafts 45 and 46.

Figure 11:
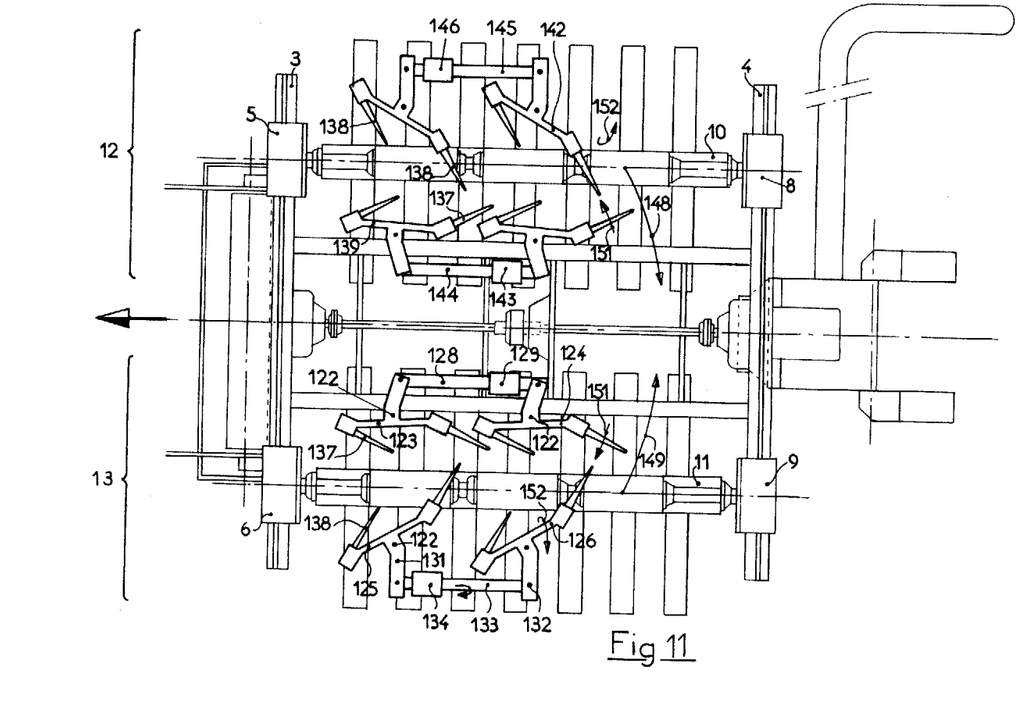
FIGS. 11 and 12 are plan views showing the farthest positions of beating members having dissymmetrical motions.
Figure 12:
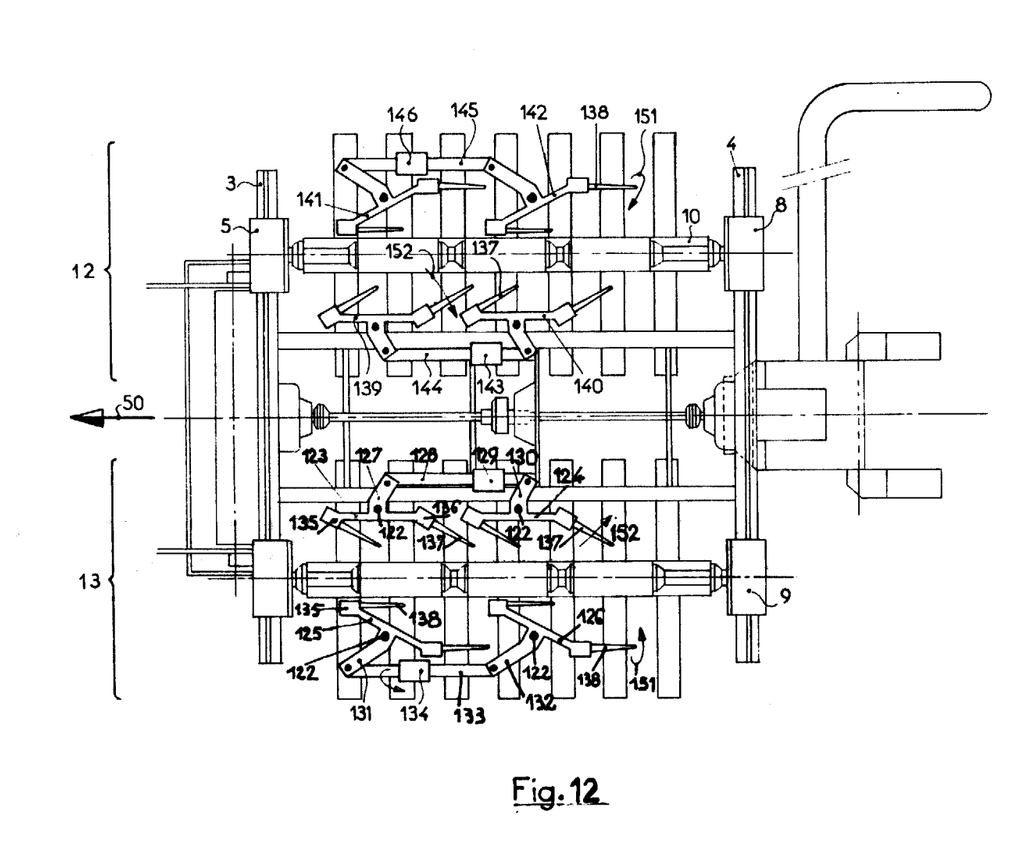

A modification of this embodiment is illustrated by FIGS. 11 and 12. On vertical spindles such as 122 (FIG. 11), vertical frames such as 123, 124, 125 and 126 are pivotally mounted. The frame 123 is rigidly connected to a link 127 which is pivotally mounted on the sliding rod 128 of a hydraulic jack, the cylinder 129 of which is fixedly mounted to the tunnel defining member 17. The rod 128 projects from either side of the cylinder 129. The link 130 of the frame 124 is pivotally mounted on the opposite end of said rod (FIG. 12).

The link 131 of the frame 125 and the link 132 of the frame 126 are pivotally mounted on the two ends of the sliding rod 133 of a hydraulic jack, the cylinder 134 of which is fixed to the opposite wall of the tunnel defining member 17.

The ends of each frame carry two vertical plates such as 135 and 136, to which horizontal rods 137 or 138 are fixed according to the arrangement described in reference to FIGS. 9 and 10.

The jacks 128–129 and 133–134 are double-acting hydraulic jacks. They are, for instance, identical. However, the feeds therefor have a difference in phase, that is, the frames and whips on one side of the tunnel do not reach the end of their stroke simultaneously with the frames and whips disposed on the opposite side of said tunnel. Thus, the spacing between the points of the rods 137 and 138 is not constant. The assymmetry of the motions is accentuated by making links 131 and 132 longer than links 127 and 130, so that the amplitude if the rods 138 is greater than the amplitude of the rods 137.

Figure 13:
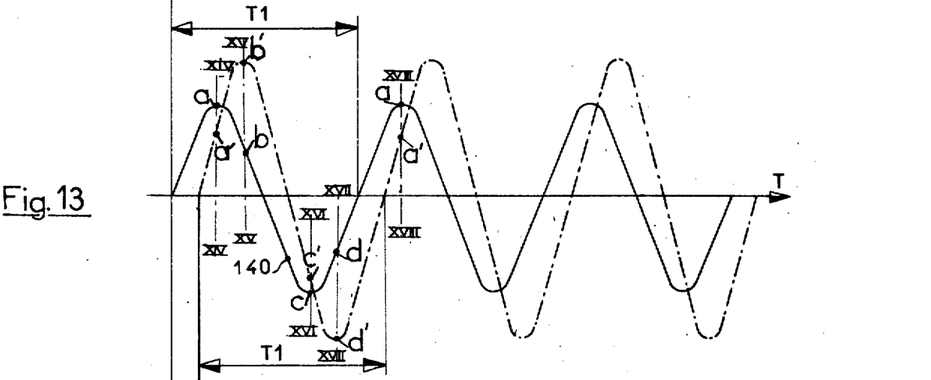
FIG. 13 is a graph showing the difference in amplitude and the difference in phase between the synchronous swinging motions of the accelerator beaters (broken lines) and the stopper beaters (full lines) of the embodiment illustrated in FIGS. 11 and 12.

FIG. 13 illustrates the path 140 described by the rods 137, as well as the path 141 described by the rods 138. The amplitude of the swinging motion generated by the links and by the motion of the double-acting jacks has been plotted as ordinate, while the time has been plotted as abscissa. Said Figure illustrates the difference in phase and the difference in amplitude of the motion of the rods. It will thus be seen that the outer frames 125 and 126 play a part identical with each other but differing from that played by the inner frames 123 and 124. The frames 142 and 139 of the second "corridor" may be either in phase, or in opposite phase, with the frames of the corridor 12 (FIGS. 11 and 12).

According to this arrangement, the foliage and the grapes are given a greater acceleration in the direction of the centre of the machine. The most part of the grapes, which fall in the direction of the arrows 148 and 149 in FIG. 11, will be collected in the space between two adjacent rows of vine stocks 14 and 15.

On the other hand, when the rods 138 reach the end of their stroke towards the centre, the rods 137 are already imparted an acceleration in the opposed direction. The difference in phase reduces the dampening by the foliage, improves the tearing off of the grapes, and, lastly, allows keeping a mean spacing sufficiently great between the points of the beating rods 137 and 138, to limit the injuries inflicted to the vines during the beating operation. In particular, this system allows reducing the tearing off of leaves, and removes the risk of breaking the branches of the stocks.

Lastly, these assymmetrical motions enable the ends of the rods to cross each other behind an obstacle, while removing the blind angles and, for instance, to detach a cluster of grapes hidden behind the foliage, whereby 90% or even more of the vintage can be collected The penetration of the rods 137 into the foliage, together with the amplitude of the motions of the rods and the spacing of the two travellers, are adjusted in the way described previously.

The difference in phase of the motions is obtained, for instance, by a difference in phase of the jacks. Said jacks may be identical or not. In general, they are provided with adjusting stops.

Figure 14:
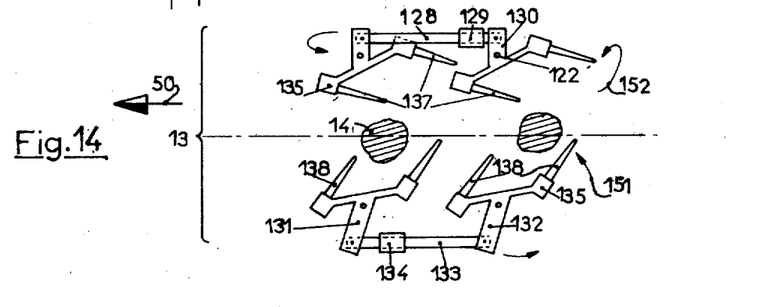
FIG. 14 shows the beating elements of the embodiments of FIGS. 11 and 12 in the position corresponding to points a–a' of FIG. 13.
Figure 15:
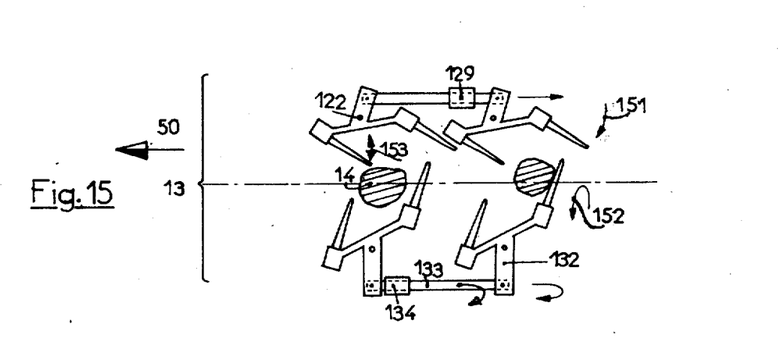
FIG. 15 shows the beating elements of the embodiments of FIGS. 11 and 12 in the position corresponding to points b–b' of FIG. 13.
Figure 16:
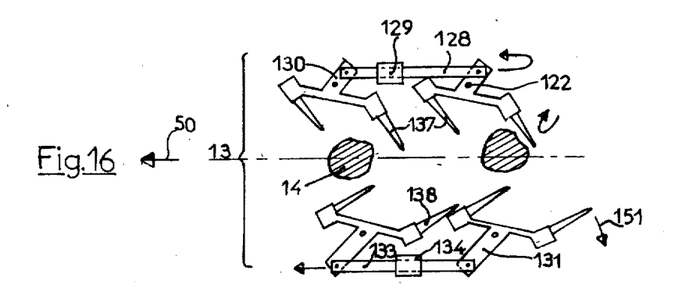
FIG. 16 shows the beating elements of the embodiments of FIGS. 11 and 12 in the position corresponding to points c–c' of FIG. 13.
Figure 17:
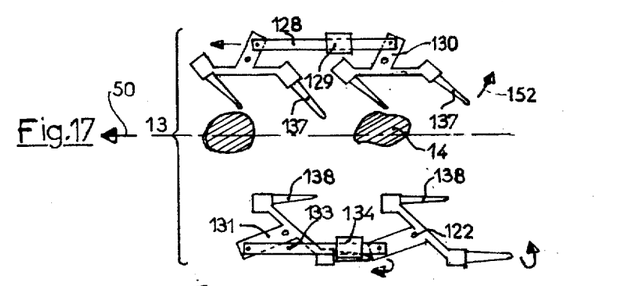
FIG. 17 shows the beating elements of the embodiments of FIGS. 11 and 12 in the position corresponding to points d–d' of FIG. 13.
Figure 18:
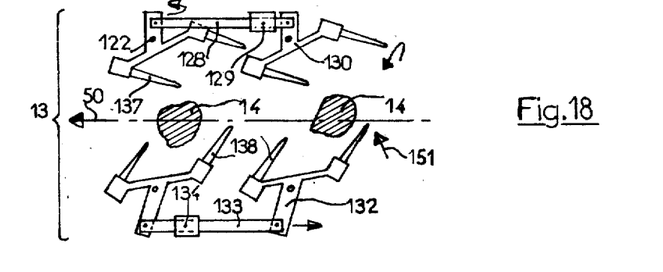
FIG. 18 shows the beating elements of the embodiments of FIGS. 11 and 12 in the position corresponding to points a–a' of FIG. 13.

FIGS. 14 to 18 illustrate the successive stages of the motion of the beating plates in a tunnel on a grape-gathering machine. FIG. 14 indicates the position of the beating mechanism at points $a$–$a'$ of FIG. 13. FIGS. 15–18 indicate the respective position of such mechanism at points $b$–$b'$, $c$–$c'$, $d$–$d'$ and $a$–$a'$ as shown in FIG. 13. It will be seen that the opposite plates are adapted to move in the same direction or in opposite directions. The motions remain synchronous.

FIGS. 14 to 18 show the device used so as to obtain an assymmetrical effect, that is, the grapes are discharged to one side only of the tunnel.

Figures 19, 20:
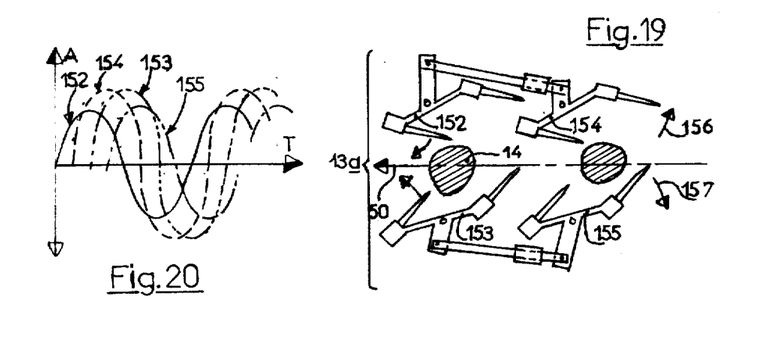
FIG. 19 shows the beating elements according to a fourth embodiment of the invention.
FIG. 20 is a graph showing the differences between phase and amplitude for beater elements corresponding to the embodiments of FIG. 19.

The principle of the invention may also be used on a machine having a global symmetrical effect, that is, in order to discharge the grapes symmetrically, as well to one side then to the other side. To this end, it is only necessary to dispose two sets of beaters 152; 153 and 154; 155 behind each other, as shown in FIG. 19. In this case, the beater 152 has a swinging amplitude lower than that of the beater 153, so that the grapes are discharged preponderently to the side indicated by the arrow 156. On the other hand, as the beater 155 has a swinging amplitude lower than that of the beater 154, this pair of beaters discharges the grapes mainly in the direction of the arrow 157. Finally, when taking into account the whole operation of the machine, equal amounts of grapes are discharged to either side of the tunnel (arrows 156 and 157). FIG. 20 illustrates the phase differences of the beaters 152–155, along with the amplitude differences plotted against time.

I claim:

1. In a beating device for a grape gathering machine of the type having a mobile structure, and at least one tunnel defining member in the shape of a downwardly open "U" having two vertical arms attached to the mobile structure such that the two vertical arms move along either side of a row of vine stocks, the improvements comprising:
   a. at least a pair of spindles pivotally attached to each of said vertical arms and extending parallel thereto;
   b. a frame pivotally attached to each spindle, equidistantly from either end of the frame;
   c. a plurality of flexible rods attached to each end of said frames, said rods facing a generally rearward direction with respect to the direction of movement of the mobile structure;

d. oscillating means attached to said at least one tunnel defining member to oscillate a pair of said frames with respect to said at least one tunnel defining member about said spindle so as to cause said rods to contact said vine stocks and shake the grapes therefrom;

e. linkage means connecting said oscillating means to a pair of said frames, and       f. means attached to said mobile structure to move said at least one tunnel defining member laterally with respect to said mobile structure.

2. A beating device according to claim 1, characterized in that:

a. each flexible rod tapers in the direction of the free end thereof; and    b. all the rods are attached to the frames such that they are horizontal, parallel to each other, and disposed one above the other in the vertical plane of the plate supporting them.

3. A beating device according to claim 2, characterized in that each rod has an oval cross-section, and is adjustably disposed on its frame such that the angular orientation of the larger diameter can be modified about the axis thereof, so as to have, in use, a flexibility varying with the orientation of the cross-section of the rod.

4. A beating device according to claim 1, characterized in that the grape-gathering machine includes two tunnel defining members that are disposed laterally adjacent to each other to define two tunnels which tops two rows of vine stocks.

5. A beating device according to claim 1, wherein the oscillating means comprises a double-acting hydraulic jack, having a horizontal cylinder fixed to the tunnel defining member, and a sliding piston rod having one end attached to one frame and a second end attached to a second frame mounted on the same side of the tunnel defining member.

6. A beating device according to claim 5, characterized in that the double acting hydraulic jack is located between two adjacent vertical spindles on the same side of the tunnel defining member.

7. A beating device according to claim 5, characterized in that the oscillating means causes each frame to oscillate    in opposite phase to the opposed frame located in the same transverse section of the tunnel defining means and    in phase with the frame located on the same side of the tunnel defining means.

8. A beating device according to claim 5, characterized in that each double-acting hydraulic jack is provided with adjusting stops, the initial position of each jack being provided in a manner such that, the motions of a frame are out of phase with respect to the motions of the opposite frame, so that the spacing between the points of the rods on two opposite frames varies during the motion thereof.

9. A beating device according to claim 1, characterized in that the linkage means connecting a first pair of frames located on the one side of the tunnel defining means to their corresponding oscillating means is of a greater length than a linkage means connecting a second pair of frames on the opposite side of said tunnel defining means to their corresponding oscillating means such that the motions of the frames on opposite sides of the tunnel defining means are assymmetrical.

10. A beating device according to claim 9, characterized in that the linkage means connecting one of a first pair of frames to its oscillating means is of a greater length than the linkage means connecting the second of the pair of frames to the oscillating means.

11. A beating device according to claim 9, characterized in that frames are controlled by double-acting jacks, which are synchronized but differ in power, which ensures the difference in phase and the difference in amplitude of the motion of the frames disposed on one side of the tunnel defining means with respect to the motion of the frames disposed on the other side of said tunnel defining means.

12. A beating device according to claim 9, characterized in that it is provided with at least two pairs of frames disposed behind each other, and arranged in the following way:

a. in a first of the pairs, a first frame has a swinging amplitude greater than that of the second frame of the first pair; and    b. in the second pair, a second frame has a swinging amplitude greater than that of a first frame while substantially equal amounts of grapes are discharged on either side of the grape-gathering tunnel.

13. A beating device according to claim 1, wherein the at least one tunnel defining member is attached to said mobile structure by at least one shaft which is disposed longitudinally on said mobil structure and means to move said at least one shaft laterally with respect to said structure.

14. A beating device according to claim 13, characterized in that the ends of the at least one shaft run on transverse runways on the mobile structure means to move said shaft laterally comprises:

a. a hydraulic motor;

b. a gear reducer mounted on each of the runways;

c. drive shafts connecting said gear reducers with said hydraulic motor;

d. endless chains connecting each of said gear reducers to an end of said shaft such that rotation of the gear reducer causes said shaft to move laterally with respect to said mobile structure.

15. A beating device according to claim 1, characterized in that eight frames are disposed in each tunnel defining means, to wit, four on each side.

* * * * *